United States Patent
Yoshida et al.

(10) Patent No.: US 10,749,611 B2
(45) Date of Patent: Aug. 18, 2020

(54) UNDERWATER RADIO COMMUNICATION SYSTEM, TRANSMITTING UNIT, RECEIVING UNIT, AND UNDERWATER RADIO COMMUNICATION METHOD

(71) Applicant: NEC CORPORATION, Tokyo (JP)

(72) Inventors: Shuhei Yoshida, Tokyo (JP); Masahiro Tanomura, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/331,671

(22) PCT Filed: Sep. 11, 2017

(86) PCT No.: PCT/JP2017/032608
§ 371 (c)(1),
(2) Date: Mar. 8, 2019

(87) PCT Pub. No.: WO2018/051932
PCT Pub. Date: Mar. 22, 2018

(65) Prior Publication Data
US 2019/0199450 A1 Jun. 27, 2019

(30) Foreign Application Priority Data
Sep. 13, 2016 (JP) .................. 2016-178731

(51) Int. Cl.
*H04B 13/02* (2006.01)
*G01S 11/02* (2010.01)
(Continued)

(52) U.S. Cl.
CPC .............. *H04B 13/02* (2013.01); *G01S 11/02* (2013.01); *H04B 1/0475* (2013.01); *H04L 27/3405* (2013.01)

(58) Field of Classification Search
CPC .............. H04L 1/0041; H04L 27/2647; H04L 2027/0018; H04B 13/02; H04B 1/0475;
(Continued)

(56) References Cited

U.S. PATENT DOCUMENTS

| | | | |
|---|---|---|---|
| 2011/0064151 A1* | 3/2011 | Rhodes ................. | H04B 13/02 375/260 |
| 2014/0044154 A1 | 2/2014 | Wolfe et al. | |
| 2016/0050030 A1* | 2/2016 | Riedl ..................... | H04B 11/00 367/133 |

FOREIGN PATENT DOCUMENTS

| | | |
|---|---|---|
| JP | 2004-015762 A | 1/2004 |
| JP | 2009-200772 A | 9/2009 |

(Continued)

OTHER PUBLICATIONS

Extended European Search Report dated Aug. 2, 2019 issued by the European Patent Office in counterpart application No. 17850834.7.
(Continued)

*Primary Examiner* — Leila Malek
(74) *Attorney, Agent, or Firm* — Sughrue Mion, PLLC (57) ABSTRACT

In order to provide an underwater radio communication system which stably uses wideband modulated signal to communicate with electromagnetic waves, this underwater radio communication system, for communicating underwater between a transmission unit and a receiving unit with electromagnetic waves, has a distortion compensation unit which compensates for distortion resulting from propagation in water in accordance with the frequency of the electromagnetic waves.

8 Claims, 10 Drawing Sheets

(51) Int. Cl.
*H04B 1/04* (2006.01)
*H04L 27/34* (2006.01)

(58) Field of Classification Search
CPC ........ H04B 10/25137; H04B 10/25253; H04B 10/50; G01S 11/02
USPC .......................................................... 375/218
See application file for complete search history.

(56) References Cited

FOREIGN PATENT DOCUMENTS

| | | | |
|---|---|---|---|
| JP | 2011-097275 A | 5/2011 | |
| WO | 2008/132480 A2 | 11/2008 | |

OTHER PUBLICATIONS

International Search Report for PCT/JP2017/032608 dated Nov. 28, 2017 [PCT/ISA/210].
Written Opinion for PCT/JP2017/032608 dated Nov. 28, 2017 [PCT/ISA/237].

\* cited by examiner

Fig.2

| COMMUNICATION METHOD | FREQUENCY BAND | IN-BAND CHARACTERISTICS FOR TRANSMISSION FOR A DISTANCE OF 100 m | | | |
|---|---|---|---|---|---|
| | | dBm | AMPLITUDE DIFFERENCE | DEGREES | PHASE DIFFERENCE |
| 32PSK | 1387~1587 | 37~47 | 10 | 128~187 | 59 |
| 16PSK | 1447~1697 | 35~47 | 12 | 146~218 | 72 |
| 8PSK | 1462~1795 | 32~47 | 15 | 151~245 | 94 |
| 4PSK | 1375~1875 | 24~47 | 23 | 124~566 | 142 |

UNDERWATER RADIO COMMUNICATION SYSTEM, TRANSMITTING UNIT, RECEIVING UNIT, AND UNDERWATER RADIO COMMUNICATION METHOD

CROSS REFERENCE TO RELATED APPLICATIONS

This application is a National Stage of International Application No. PCT/JP2017/032608 filed Sep. 11, 2017, claiming priority based on Japanese Patent Application No. 2016-178731 filed Sep. 13, 2016, the disclosure of which is incorporated herein in its entirety.

TECHNICAL FIELD

The present invention relates to underwater radio communication systems, transmitting units, receiving units, and underwater communication methods and, more particularly, to an underwater radio communication system, a transmitting unit, a receiving unit, and an underwater communication method that use electromagnetic waves.

BACKGROUND ART

The area ratio of the land and sea of Japan is one to eleven, while the area ratio of the land and sea of the whole world is three to seven, and thus, a role played by the ocean development is important for the growth of Japan in the 21st century. In the field of the ocean development, supervising and monitoring techniques for the development of seabed resources, the research of marine environments and organisms, and the monitoring of earthquakes, the facility management for power generation on the sea and a marine farm that are expected to be increasingly built in the near future, and the like are highly expected. In order to efficiently and safely practice the supervising and monitoring, communication technology in seawater plays an important role. Currently, in most of cases, communication with a home base station on the sea or land is made through wired cables, but this configuration imposes a large limitation on devices installed on seabed, the action ranges of underwater robots, and the like. Thus, for communication with installation points of the devices on seabed and communication with the underwater robots, the research and development of underwater acoustic communication techniques that enable realization of wireless communication have been actively conducted.

Such underwater acoustic communication has been widely and generally used because it is capable of achieving both of a broad communication region extending to a distance longer than several km and a transmission speed sufficient for the transmission of control commands and the transmission of images (namely, a transmission speed>several kbps).

For example, an underwater acoustic communication technique is disclosed in Patent Literature (PTL) 1. In an underwater communication method disclosed in PTL 1, a wave receiver convers an acoustic signal having been propagated in water into an electrical signal, and a receiving circuit amplifies a weak acoustic electrical signal from the wave receiver. The receiving circuit frequency-analyzes FSK (Frequency Shift Keying) modulated waves of a received signal composed of a start pulse, data pulses, and an end pulse to thereby detect the presence or absence of the start pulse. Upon confirmation of the presence of the start pulse, the receiving circuit makes a code determination using the result of the frequency analysis by which detected signals have been temporally separated.

CITATION LIST

Patent Literature

[PTL 1] Japanese Unexamined Patent Application Publication No. 2004-015762

SUMMARY OF INVENTION

Technical Problem

In the underwater acoustic communication, however, in a sea area in which the depth is low and which is under an environment where a large number of precipitated objects on seabed or floating objects are dispersed, the degree of transparency is low, and the scale of wind wave is high, or in any other similar area, a phenomenon in which acoustic communication becomes difficult or the communication speed significantly is decreased, due to the influence of a sound reverberation and the like sometimes occurs. Moreover, in the acoustic communication, a spatial region within which initiated communication is disabled (namely, a blind zone) occurs. Furthermore, in such an environment that the degree of transparency is low, communication using light rays cannot be expected.

Thus, in order to establish communication technology that can be freely used in seawater, communication using electromagnetic waves is expected. In order to utilize this electromagnetic waves, however, a propagation loss caused by seawater is so large that the use of an extremely low frequency band (which is a frequency band approximately from several hundreds Hz to ten kHz, and is also called extremely long waves) is necessary in order to make communication for a distance longer than or equal to 100 m. When electromagnetic waves having a frequency of 10 kHz is used, during propagation for a distance longer than or equal to 100 m, a signal intensity is attenuated by an intensity level larger than or equal to 100 dB. For this reason, when transmission power at a mobile-phone base station or the like, that is, transmission power from several hundreds W to several kW, is assumed, the use of a frequency lower than or equal to 10 kHz is realistic.

Meanwhile, in general, the lower a frequency is, the narrower a bandwidth that can be used in communication is, and thus, the communication path capacity (namely, the upper limit of the amount of information that can be transmitted with certainty through a communication path) decreases. For example, when a case in which the use of a transmitter operating at 1 kHz is considered and it is assumed that a communication band having a bandwidth of 0.1 kHz is obtained and received power having reached a receiver is 100 mW, an obtainable communication path capacity is just 0.67 kb/sec. That is, in a case in which communication is desired to be made for a distance that is approximately longer than or equal to 100 m and that is required in a case in which there is formed an observation network in which various kinds of measurement means, such as a seabed installation type sensor, an underwater robot, an observation buoy, and the like are distributed, when an extremely low frequency for which an attenuation caused by seawater is small is used, it is difficult to obtain such a transmission speed higher than several kbps as that having been able to be achieved in the acoustic communication.

An object of the present invention is to provide an underwater radio communication system, a transmitting unit, a receiving unit, and an underwater radio communication method that enable high-speed and long-distance transmission to be made underwater with electromagnetic waves.

Solution to Problem

An underwater radio communication system of the present invention is an underwater radio communication system for communicating underwater between transmitting unit and receiving unit with electromagnetic waves, and the underwater radio communication system comprises: distortion compensation unit configured to compensate for a distortion resulting from propagation in seawater in accordance with a frequency of the electromagnetic waves.

A transmitting unit of the present invention is a transmitting unit that is for use in an underwater radio communication system and that communicates in water with a receiving unit with electromagnetic waves, and the transmitting unit comprises: a first distortion compensation unit configured to apply, to a transmitting signal, a pre-distortion for compensating for a distortion due to an electrical conductivity of seawater.

A receiving unit of the present invention is receiving means that is for use in an underwater radio communication system and that communicates with transmitting unit underwater with electromagnetic waves, and the receiving unit comprises: second distortion compensation unit configured to compensate for a distortion due to an electrical conductivity of seawater in a received signal.

An underwater radio communication method of the present invention is an underwater radio communication method for communicating underwater with electromagnetic waves, and the underwater radio communication method comprises: applying, to a transmitting signal, a pre-distortion for compensating for a distortion due to an electrical conductivity of seawater.

Advantageous Effects of Invention

According to some aspects of the present invention, it is possible to achieve an underwater radio communication system, a transmitting unit, a receiving unit, and an underwater radio communication method that enable high-speed and long-distance transmission to be made underwater with electromagnetic waves.

EXAMPLE EMBODIMENT

Figure 1:
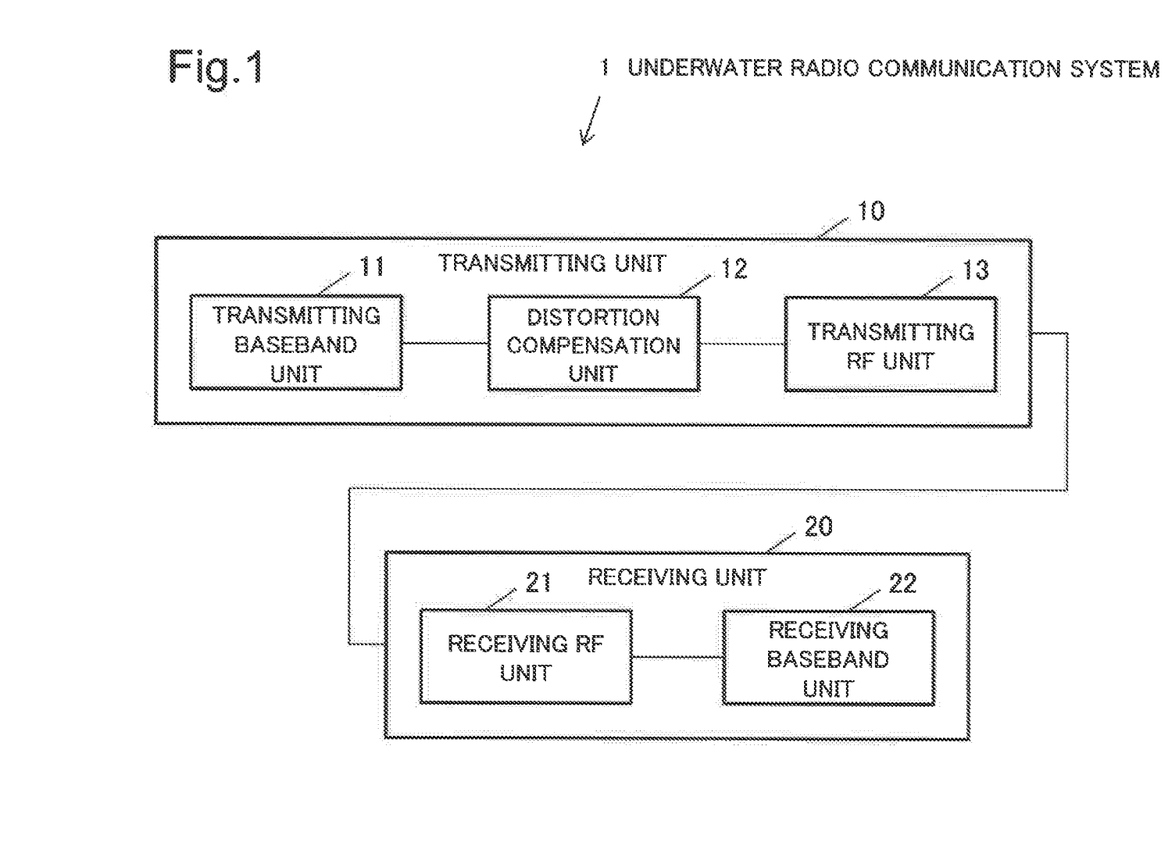
FIG. 1 is a plan view of an underwater radio communication system according to a first example embodiment of the present invention, illustrating the configuration of the underwater radio communication system.

Hereinafter, example embodiments of the present invention will be described with reference to the drawings. FIG. 1 is a plan view of an underwater radio communication system according to a first example embodiment of the present invention, illustrating the configuration of the underwater radio communication system.

As illustrated in FIG. 1, an underwater radio communication system 1 is constituted of a transmitting unit 10, namely, a transmitting unit including a transmitting baseband unit 11, a distortion compensation unit 12, and a transmitting RF unit 13; and a receiving unit 20, namely, a receiving unit including a receiving RF unit 21 and a receiving baseband unit 22.

The transmitting baseband unit 11 of the transmitting unit 10 generates wideband modulated signals based on transmitting data. The transmitting baseband unit 11 uses a frequency band lower than or equal to 1 MHz and, more particularly, a frequency band within a ULF band (300 Hz to 3 kHz), as a frequency band used by a communication system. In seawater, a carrier frequency and a transmission distance largely depend on each other and the transmission distance is proportional to negative 0.5 power of the carrier frequency, and thus, the transmitting baseband unit 11 may select the frequency considering the transmission distance. The transmitting baseband unit 11 uses multicarrier modulated signals, such as OFDM modulated signals or the like, and sets the bandwidths of subcarriers of the multicarrier modulated signals. The transmitting baseband unit 11 changes the bandwidths of the subcarriers, which are to be set, in accordance with a frequency band and a transmission distance. Further, the transmitting baseband unit 11 may select the frequency band and a modulation method considering a transmission rate.

For example, when high-speed transmission is made for a short distance, the transmitting baseband unit 11 selects a frequency band of 200 kHz, a bandwidth of 50 kHz, and a 32 PSK method. The use of the frequency band of 200 kHz, the bandwidth of 50 kHz, and the 32 PSK method enables realization of transmission at 250 kbps for a distance longer than or equal to 5 m even in seawater, thereby enabling realization of the guidance of a submarine and high-speed transmission to/from underwater equipment or the like. Further, when relatively long distance communication is made, the transmitting baseband unit 11 selects, for example, a frequency band of 2 kHz, a bandwidth of 250 Hz, and the 32 PSK method. The use of the frequency band of 2 kHz, the bandwidth of 250 Hz, and the 32 PSK method enables realization of long distance transmission at 1 kbps for a distance longer than or equal to 100 m.

The frequency dependencies of a signal attenuation amount difference and a phase difference in seawater are different from and larger than those in air. This is because an electrical conductivity and a relative permittivity in seawater are respectively 4 S/m (zero in air) and 81 ("1" in air), and are higher than those in air. For this reason, when, for example, electromagnetic waves having a frequency of 1.4 kHz and electromagnetic waves having a frequency of 1.9 kHz are transmitted for a distance of 100 m, a signal attenuation amount difference therefor and a phase difference therefor are significantly large, that is, approximately 23 dB and 140 degrees, respectively (both being approximately zero in air). When the bandwidth and the transmission distance are constant, the lower the frequency band is, the further the above differences expand. The transmitting unit 10 and the receiving unit 20 may include a lookup table in which, for each of specific transmission distances, a frequency and a pair of a signal attenuation amount and a phase delay amount are retained in such a way as to be associated with each other. Further, the transmitting unit 10 or the receiving unit 20 may include a lookup table in which the pair of the signal attenuation amount and the phase delay amount is retained in such a way as to be associated with, not only the frequency, but also the frequency, a transmission distance, and an electrical permittivity. In this case, the transmitting unit 10 or the receiving unit 20 may be configured to, without being limited to the lookup table, include a calculation unit that calculates and outputs the signal attenuation amount and the phase delay amount.

Figure 2:
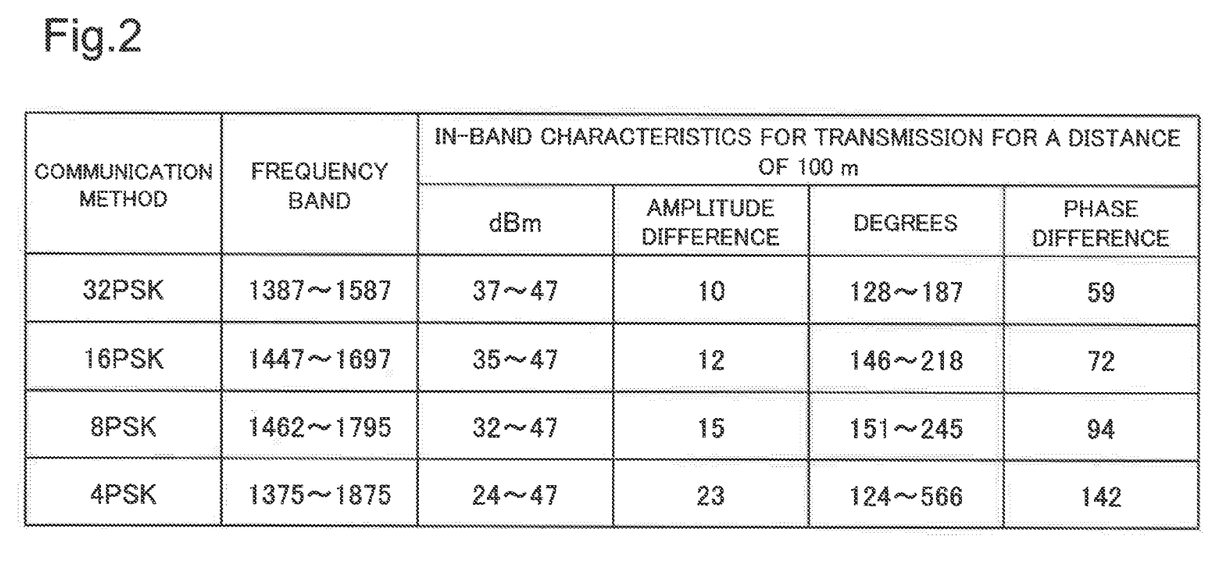
FIG. 2 is a diagram illustrating an in-band characteristic for each of communication methods.

FIG. 2 is a diagram illustrating an in-band characteristic for each of communication methods. The amplitude attenuation and the phase delay largely vary in accordance with frequencies in water. In a case in which, when transmission for a distance of 100 m is made, it is assumed that a communication method is 4 PSK and a frequency band is from 1375 Hz to 1875 Hz, as illustrated in FIG. 2, for the amplitude attenuation, the signal intensity at 1375 Hz is 47 dBm, while the signal intensity at 1875 Hz is attenuated to 24 dBm. Thus, a signal intensity difference of 23 dBm occurs within the band. Further, the phase delay at 1375 Hz is 124 degrees, while the phase delay at 1875 Hz comes to even 566 degrees.

Figure 3:
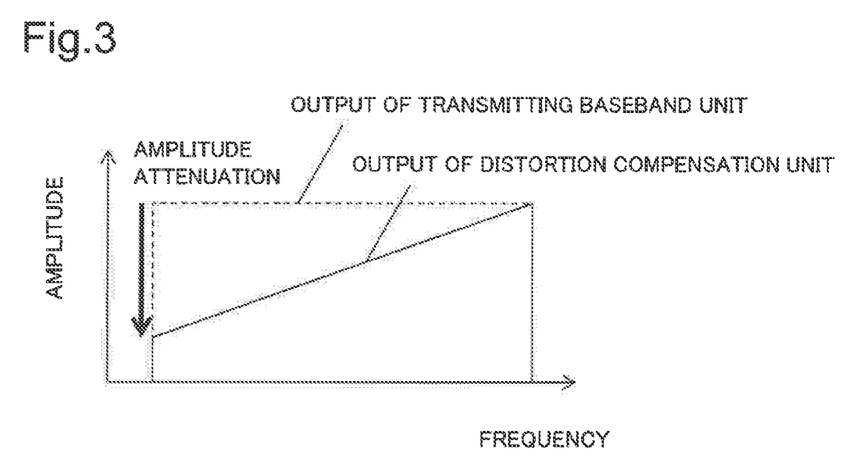
FIG. 3 is a diagram illustrating amplitude attenuating operation by a distortion compensation unit of FIG. 1.
Figure 4:
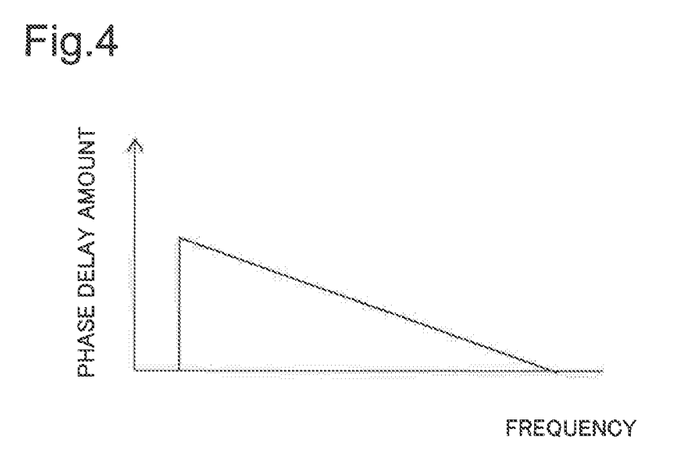
FIG. 4 is a diagram illustrating phase delaying operation by a distortion compensation unit of FIG. 1.

In such a way as to allow an amplitude difference and a phase difference that arise within a band with respect to a signal having been received by the receiving unit 20 to be fallen within a range in which the receiving unit 20 is capable of demodulating the signal, the distortion compensation unit 12 applies, within a band of the frequency of the signal, a pre-distortion based on the amplitude difference and the phase difference, in accordance with the frequency of the signal. The distortion compensation unit 12 estimates a distortion resulting from propagation in seawater from the transmitting of a transmitting signal by the transmitting unit 10 up to the receiving of the transmitting signal by the receiving unit 20. The distortion compensation unit 12 may refer to the above lookup table to thereby estimate a distortion that is to arise, due to an electrical conductivity of seawater, in a received signal received by the receiving unit 20. The distortion compensation unit 12 performs amplitude attenuating operation and phase delaying operation on the transmitting signal to give a distortion to the transmitting signal so as to compensate for the estimated distortion. FIG. 3 is a diagram illustrating the amplitude attenuating operation by the distortion compensation unit 12 of FIG. 1. FIG. 4 is a diagram illustrating the phase delaying operation by the distortion compensation unit 12 of FIG. 1. As illustrated in FIG. 3, for the output of the transmitting baseband unit 11, the lower the frequency of the transmitting signal is, the further the distortion compensation unit 12 decreases the amplitude of the transmitting signal in accordance with an amplitude difference of FIG. 2. Further, as illustrated in FIG. 4, for the output of the transmitting baseband unit 11, the lower the frequency of the transmitting signal is, the further the distortion compensation unit 12 delays the phase of the transmitting signal in accordance with a phase difference of FIG. 2.

The transmitting RF unit 23 transmits a transmitting signal resulting from the pre-distortion having been applied by the distortion compensation unit 12.

The receiving RF unit 21 of the receiving unit 20 receives the transmitting signal having been transmitted from the transmitting unit 10, and the receiving baseband unit 22 covers a signal from the receiving unit 20 into a baseband signal. For the received signal having been received by the receiving unit 20, an amplitude attenuation of the received signal in a higher frequency region comes to the same degree as that of an amplitude attenuation in a lower frequency region, which has been given by the distortion compensation unit 12, and a phase delay of the received signal in the higher frequency region comes to the same degree as that of a phase delay in the lower frequency region, which has been given by the distortion compensation unit 12.

The present embodiment enables realization of compensation for a signal distortion within a band, which is due to an electrical conductivity of seawater and occurs when a wideband signal is used in seawater. Thus, even when a carrier frequency band is lowered in order to increase a transmission distance, the increase of the transmission rate can be achieved. With this configuration, high-speed and long-distance transmission that is made in seawater with electromagnetic can be achieved.

The present embodiment enables realization of compensation for a distortion resulting from propagation in seawater, and thus, high-speed transmission can be achieved.

It should be noted that the configuration of the present embodiment is not limited to the configuration in which the pre-distortion is applied to a transmitting signal based on the estimation of a distortion resulting from propagation in seawater. There may be employed a configuration that does not allow any distortion to be given to the transmitting signal and that allows the amplitude of the received signal to be increased and allows the phase of the received signal to be delayed in accordance with the frequency of the received signal in such a way that a distortion having occurred in a received signal is compensated for.

Figure 5:
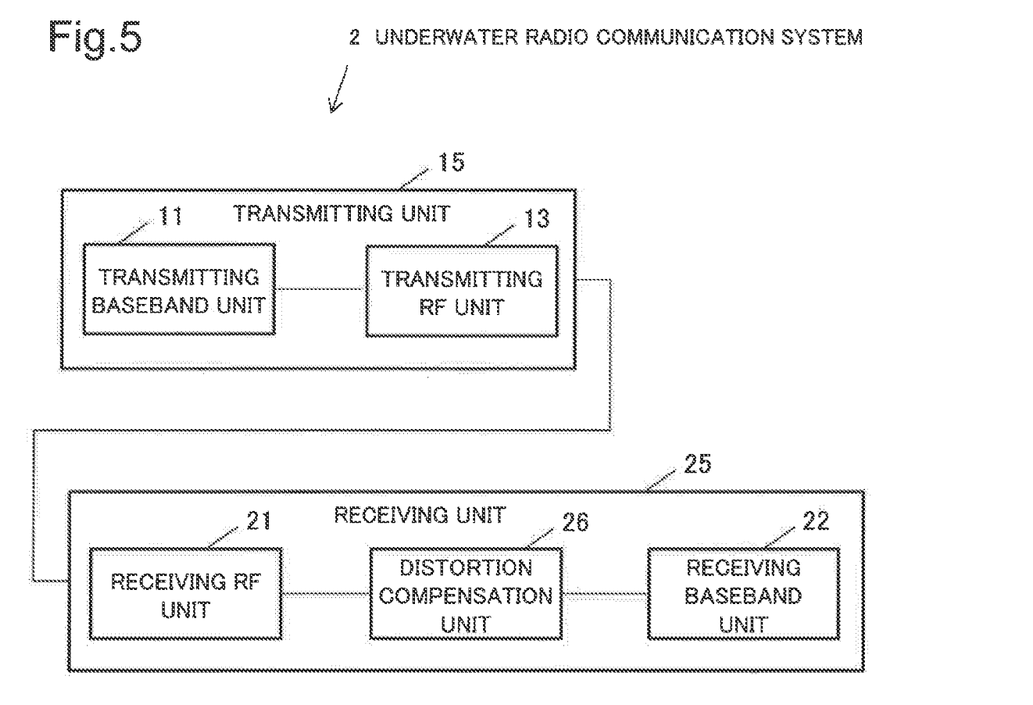
FIG. 5 is a diagram illustrating the configuration of a modification example for FIG. 1.

FIG. 5 is a diagram illustrating the configuration of a modification example for FIG. 1. As illustrated in FIG. 5, the configuration of an underwater radio communication system 2 is different from that of FIG. 1 in that the underwater radio communication system 2 is provided with a distortion compensation unit 26 in a receiving unit 25. In the present modification example, the transmitting baseband unit 11, which is the same as that of FIG. 1, uses multicarrier modulated signals, such as OFDM modulated signals or the like, and sets the bandwidths of subcarriers of the multicarrier modulated signals. The transmitting baseband unit 11 changes the bandwidths of the subcarriers, which are to be set, in accordance with a frequency band and a transmission distance. Further, the transmitting baseband unit 11 may select the frequency band and a modulation method considering a transmission rate.

Further, the transmitting RF unit 13 transmits a transmitting signal that has been output from the transmitting baseband unit 11 and that is not given a distortion that is estimated to occur on a transmission path. The receiving RF unit 21 of the receiving unit 25 receives the signal having been transmitted from the transmitting unit 15, and outputs a signal resulting from processing on the received signal to a distortion compensation unit 26. The distortion compensation unit 26 performs amplitude increasing operation and phase delaying operation on the signal having been output from the receiving RF unit 21, so as to compensate for a distortion that is estimated to have occurred due to an electrical conductivity in seawater.

Figure 6:
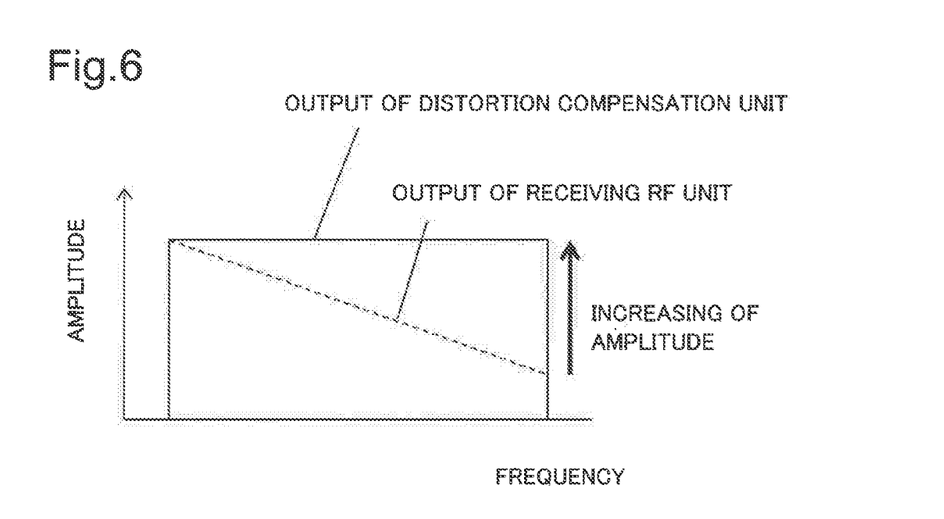
FIG. 6 is a diagram illustrating amplitude increasing operation by a distortion compensation unit of FIG. 5.

FIG. 6 is a diagram illustrating the amplitude increasing operation by the distortion compensation unit of FIG. 5. As illustrated in FIG. 6, for the output of the receiving RF unit 21, the higher the frequency is, the further the distortion compensation unit 26 increases the amplitude of the signal in accordance with an amplitude difference of FIG. 2.

Figure 7:
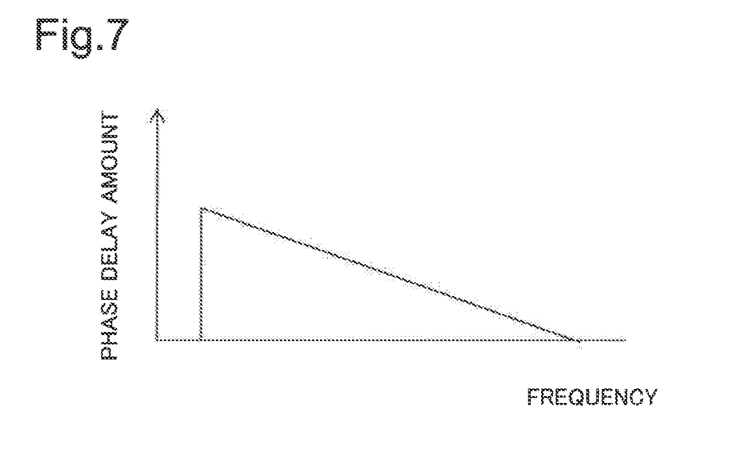
FIG. 7 is a diagram illustrating phase delaying operation by a distortion compensation unit of FIG. 5.

FIG. 7 is a diagram illustrating the phase delaying operation by the distortion compensation unit of FIG. 5. As illustrated in FIG. 7, for the output of the receiving RF unit 21, the lower the frequency is, the further the distortion compensation unit 26 delays the phase in accordance with a phase difference of FIG. 2.

In this way, the distortion compensation unit 26 outputs, to the receiving baseband unit 22, a signal having been given a distortion that differs in accordance with frequencies, and the receiving baseband unit 22 converts the signal into a baseband signal.

Similarly to the first example embodiment, the present modification example enables realization of compensation for a distortion within a band, which is due to an electrical conductivity of seawater and occurs when a wideband signal is used in seawater. Thus, even when a carrier frequency band is lowered in order to increase a transmission distance, the increase of the transmission rate can be achieved. With this configuration, high-speed and long-distance transmission can be made in seawater with electromagnetic waves.

Figure 8:
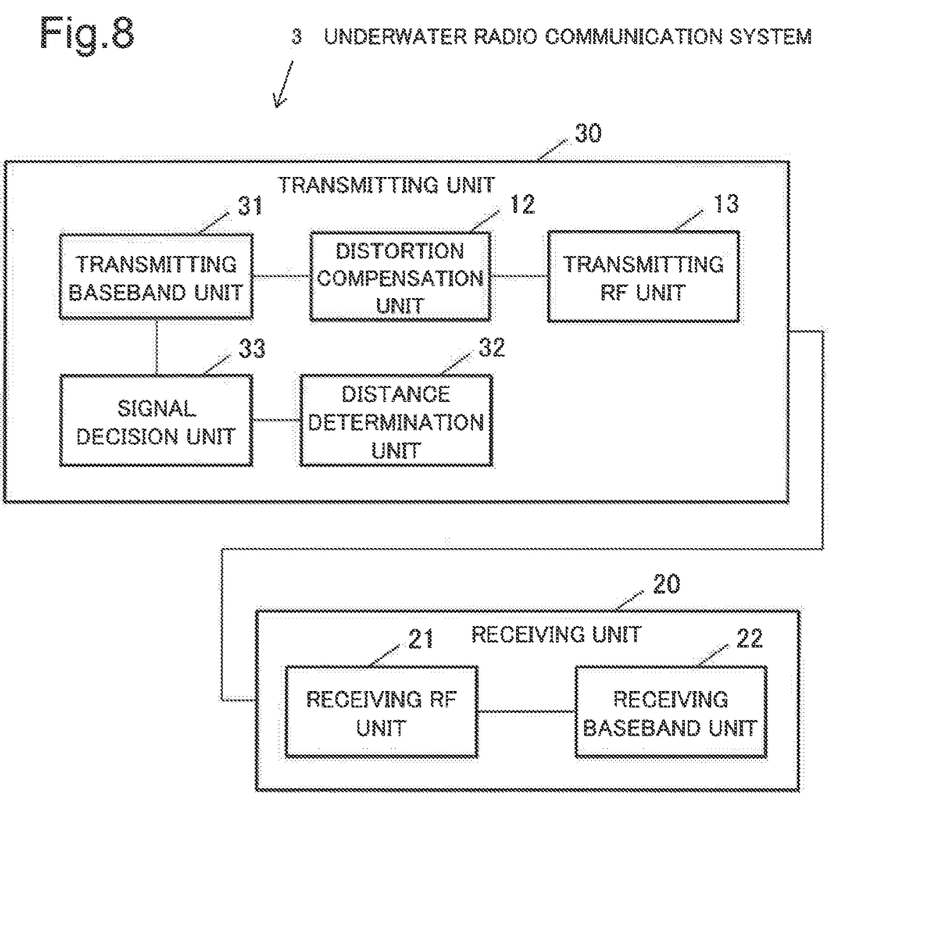
FIG. 8 is a block diagram illustrating the configuration of an underwater radio communication system according to a second example embodiment of the present invention.

Next, a second example embodiment will be described. FIG. 8 is a block diagram illustrating the configuration of an underwater radio communication system 3, namely, an underwater radio communication system according to this second example embodiment of the present invention. The underwater radio communication system 3 of the present embodiment is different from the first example embodiment in that the underwater radio communication system 3 includes a distance determination unit 32, namely, a distance determination unit that determines a transmission distance between a transmitting unit 30 and the receiving unit 20, and a signal decision unit 30, namely, a signal decision unit that decides the bandwidths of the subcarriers in accordance with the frequency and the transmission distance.

When a bandwidth is constant, narrowing the bandwidth of each of the subcarriers (increasing the number of the subcarriers) enables reduction of a distortion within a band of each of the subcarriers, but increasing the number of the subcarriers decreases the transmission rate because redundant bands are increased.

According to the present embodiment, a transmitting baseband unit 31 uses that subcarrier's bandwidths that are determined in accordance with a frequency band and a transmission distance. With this configuration, high-speed and long-distance transmission can be achieved without decreasing the transmission rate beyond necessity. Here, it should be noted that the bandwidth of each of the subcarriers may not be necessarily set to the same width. In seawater, the higher the frequency is, the larger the loss is, and thus, the higher the frequency of each of the subcarriers is, the further the bandwidth of the each subcarrier may be widened. In this case, for example, the transmitting baseband unit 31 is provided with a table in which each of the frequencies of the subcarriers is associated with a corresponding one of the bandwidths; sets a reference value for the bandwidths of the subcarriers in accordance with a frequency band and a transmission distance; and then, sequentially determines the bandwidth of each of the subcarriers referring to the table, in such a way that the higher the frequency of the each subcarrier is, the further the bandwidth of the each subcarrier is widened. This method of determining the bandwidth of each of the subcarriers in such a way that the higher the frequency of the each subcarriers is, the further the bandwidth of the each subcarrier is widened enables the influence of a loss in the each subcarrier to be uniformed.

Figure 9:
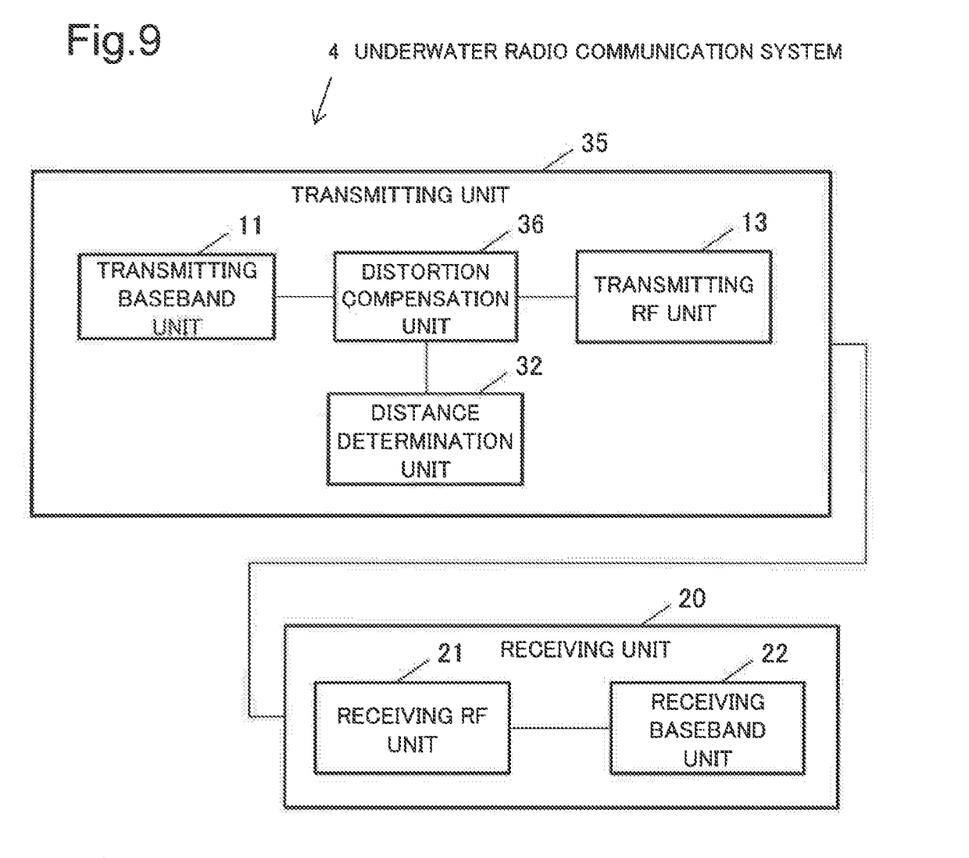
FIG. 9 is a block diagram illustrating the configuration of an underwater radio communication system according to a third example embodiment of the present invention.

Next, a third example embodiment will be described. FIG. 9 is a block diagram illustrating the configuration of an underwater radio communication system 4, namely, an underwater radio communication system according to this third example embodiment of the present invention.

As described above, since the electrical conductivity and the relative permittivity in seawater are 4 S/m (zero in air) and 81 ("1" in air), respectively, and thus, are higher than those in air, the frequency dependencies of the signal attenuation amount difference and the phase difference in seawater are different from and larger than those in air. For example, when electromagnetic waves having a frequency of 1.4 kHz and electromagnetic waves having a frequency of 1.9 kHz are transmitted for a distance of 100 m, a signal attenuation difference and a phase difference therefor are approximately 23 dB and 140 degrees, respectively, and thus, are significantly high (both being approximately zero in air). When a bandwidth is constant, the lower a frequency band is and the longer a transmission distance is, the further the above differences expand.

In the present embodiment, a transmitting unit 35 includes a distance determination unit 32, namely, a distance determination unit that determines a transmission distance between the transmitting unit 35 and the receiving unit 20, and a distortion compensation unit 36 applies a pre-distortion based on an amplitude difference and a phase difference, in accordance with the frequency of a transmitting signal and a transmission distance having been determined by the distance determination unit 32.

According to the present embodiment, the transmitting unit 35 applies a pre-distortion in accordance with a frequency band and a transmission distance, and thus, is capable of accurately compensating for a distortion resulting from propagation in seawater, as compared with the first example embodiment. Thus, high-speed and long-distance transmission beyond that of the first example embodiment can be achieved.

Figure 10:
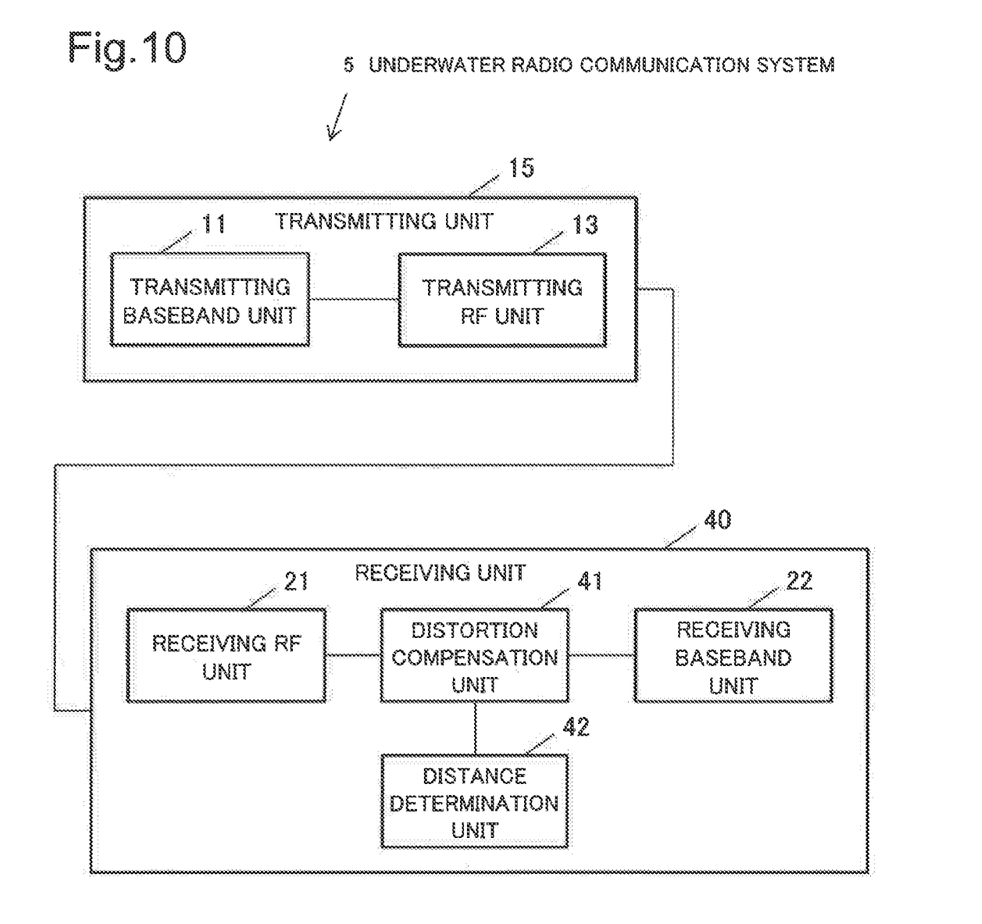
FIG. 10 is a diagram illustrating the configuration of a modification example for FIG. 9.

In this case, the receiving unit 20 may be configured to apply distortion compensation in accordance with a frequency band and a transmission distance. FIG. 10 is a diagram illustrating the configuration of a modification example for FIG. 9. As illustrated in FIG. 10, in the present modification example, an underwater radio communication system 5 may be configured such that a distance determination unit 42 is included in a receiving unit 40, and a distortion compensation unit 41 compensates for, within a band, a distortion in accordance with the frequency of a received signal and a transmission distance having been determined by the distance determination unit 42. The transmitting RF unit 13 transmits a signal having been output from the transmitting baseband unit 11 and being not given a distortion that is estimated to occur on a transmission path. The receiving RF unit 21 of the receiving unit 40 receives a signal having been transmitted from the transmitting unit 15, and outputs a signal resulting from processing on the received signal to the distortion compensation unit 41. The distortion compensation unit 41 compensates for a distortion due to an amplitude difference and a phase difference that are estimated to have occurred due to an electrical conductivity of seawater, in accordance with the frequency of the received signal and the transmission distance having been determined by the distance determination unit 42.

According to the present modification example, similarly to the above third example embodiment, the receiving unit 40 applies distortion compensation to a received signal in accordance with a frequency band and the transmission distance having been determined by the distance determination unit 42, and thus, is capable of accurately compensating for a distortion resulting from propagation in seawater, as compared with the first example embodiment. Thus, high-speed and long-distance transmission beyond that of the first example embodiment can be achieved.

Figure 11:
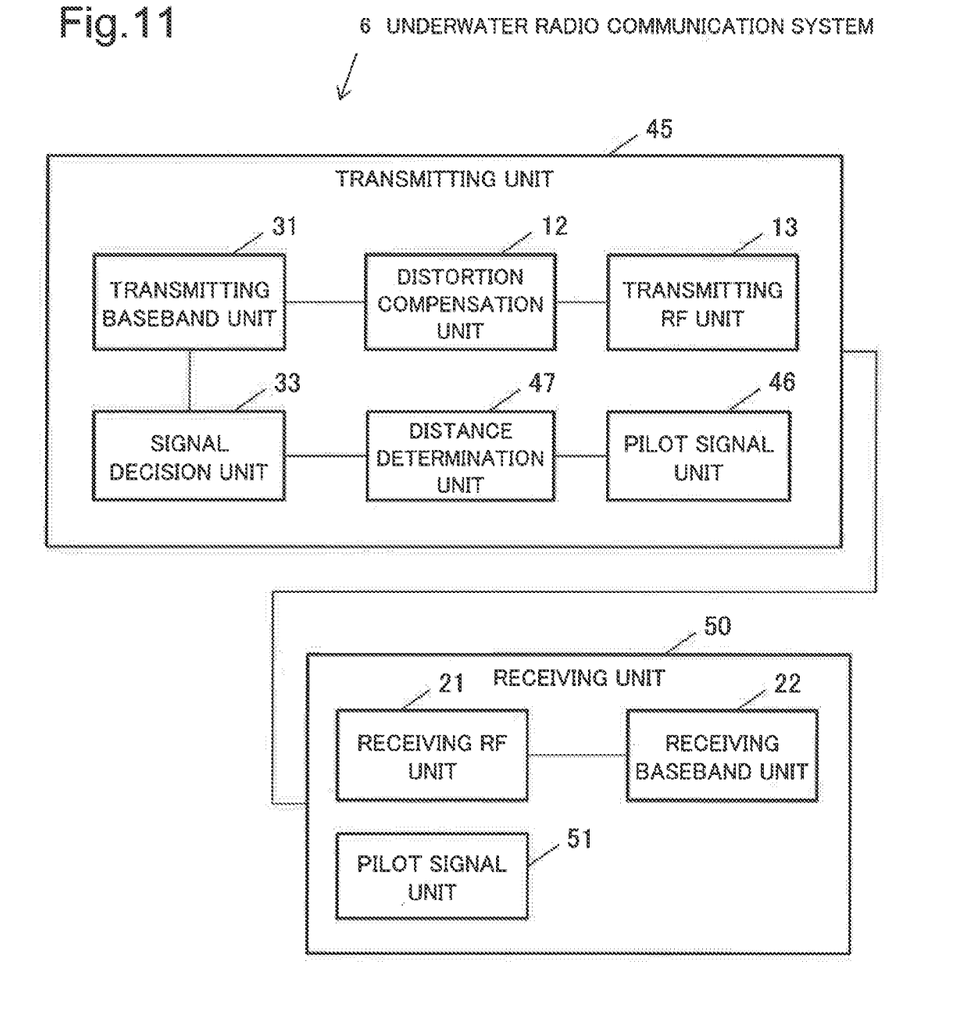
FIG. 11 is a block diagram illustrating the configuration of an underwater radio communication system according to a fourth example embodiment of the present invention.

Next, a fourth example embodiment will be described. FIG. 11 is a block diagram illustrating the configuration of an underwater radio communication system 6, namely, an underwater communication system according to this fourth example embodiment of the present invention. The present example embodiment is different from the first, second, and third embodiments in that a transmitting unit 45 and a receiving unit 50 respectively include a pilot signal unit 46 and a signal unit 51, and the signal units 46 and 5 are used for transmitting and receiving a pilot signal including information in relation to a transmitted time and a frequency with respect to the pilot signal. The pilot signal unit 51 of the receiving unit 50 transmits the pilot signal, and the pilot signal unit 46 of the transmitting unit 45 receives the pilot signal. A distance determination unit 47, namely, a distance determination unit included in the transmitting unit 45, estimates a transmission distance from the transmitted time in the receiving unit 50 and a received time in the transmitting unit 45 with respect to the pilot signal.

A propagation velocity in seawater, in which an electric conductivity is high, decreases significantly compared with that in air because of the influence of a wavelength reduction effect. For example, when the frequency is 1.9 kHz, the propagation velocity is 69 km/s and a line-of-site transmittable distance is approximately 100 m, and when the frequency is 0.9 kHz, the propagation velocity is 47 km/s and the line-of-site transmittable distance is approximately 150 m. The above configuration, therefore, enables realization of estimation of a transmission distance from a transmitted time, a received time, and a frequency with respect to the pilot signal.

According to the present example, providing the pilot signal units 46 and 51 enables realization of an accurate measurement of a transmission distance between the transmitting unit 45 and the receiving unit 50, and thus, accurate compensation for a distortion resulting from propagation in seawater can be achieved. Accordingly, even in the underwater communication, high-speed transmission can be achieved.

Figure 12:
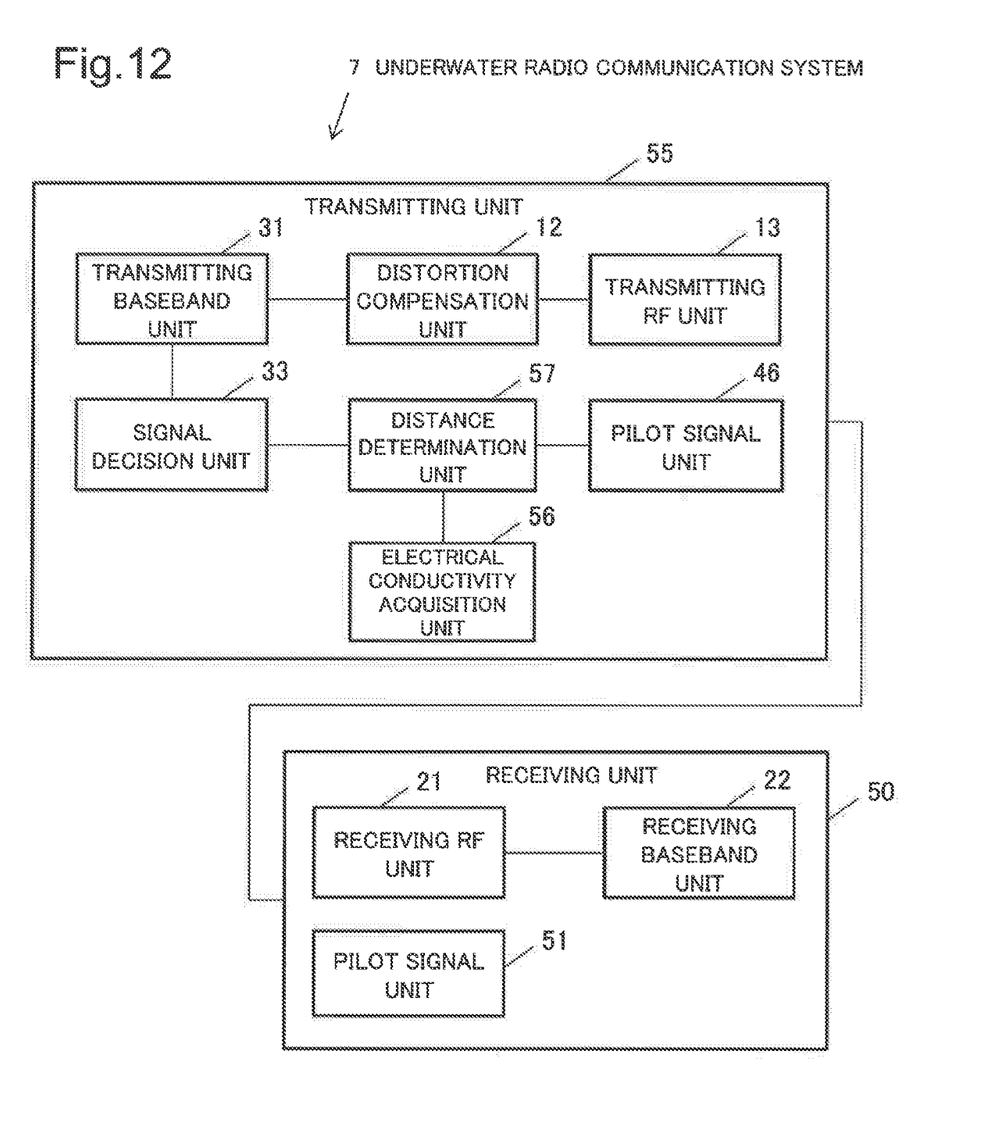
FIG. 12 is a diagram illustrating the configuration of an underwater radio communication system according to a fifth example embodiment of the present invention.

Next, a fifth example embodiment will be described. FIG. 12 is a diagram illustrating the configuration of an underwater radio communication system 7, namely, an underwater radio communication system according to this fifth example embodiment of the present invention. The present example embodiment is different from the first to fourth example embodiments in that a transmitting unit 55 includes an electrical conductivity acquisition unit 56, namely, an electrical conductivity acquisition unit that acquires an electrical conductivity of seawater in the vicinity of the transmitting unit 55.

A propagation velocity is influenced by an electrical conductivity, and thus, the addition of information in relation to the electrical conductivity enables realization of highly accurate estimation of a transmission distance. For example, in a case in which the frequency is 0.9 kHz, when the electrical conductivity decreases from 4 S/m to 3 S/m, the propagation velocity increases to 54 km/s. The electrical conductivity acquisition unit 56 of the transmitting unit 55 acquires, for example, an electrical conductivity of seawater in the vicinity of the transmitting unit 55, and a distance determination unit 52 estimates a transmission distance considering not only a transmitted time, a received time, a frequency distance with respect to a pilot signal, which are acquired from the pilot signal units 46 and 51, but also the electrical conductivity from the electrical conductivity acquisition unit 56.

According to the present example embodiment, providing not only the pilot signal units 46 and 51, but also the electrical conductivity acquisition unit 56 enables grasping of a transmission distance with accuracy, and thus, accurate compensation for a distortion resulting from propagation in seawater can be acquired. Accordingly, in the underwater communication, high-speed and long-distance transmission can be achieved.

Figure 13:
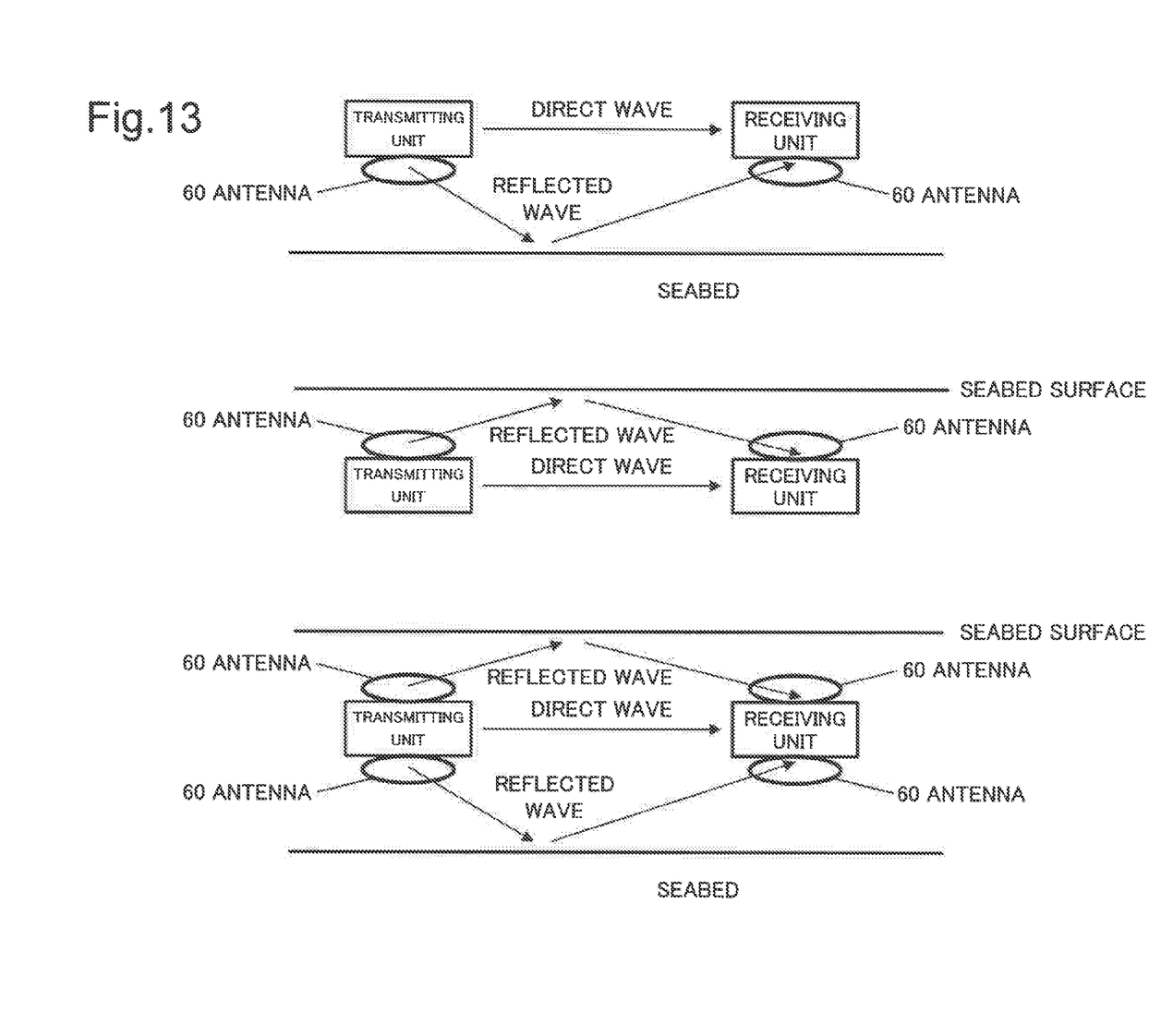
FIG. 13 is a diagram illustrating the configuration of an underwater radio communication system according to a sixth example embodiment of the present invention.

Next, a sixth example embodiment will be described. FIG. 13 is a diagram illustrating the outline of an underwater radio communication system according to this sixth example embodiment of the present invention. In the present example embodiment, a signal having been emitted from a transmitting unit is reflected at a seabed surface, a seawater surface, or both of the seabed surface and the seawater surface, and a receiving unit receives a reflected signal. Each of the transmitting unit and the receiving unit of the present example embodiment is provided with an antenna 60 on the seabed side face, the seawater-surface side face, or both of the seabed side face and the seawater-surface side face.

The difference between an electrical conductivity in seawater and an electrical conductivity on each of the seawater surface and the seabed surface as well as the difference between a relative permittivity in seawater and a relative permittivity on each of the seawater surface and the seabed surface is large, and thus, a reflectance at each of the above surfaces is high. The utilization of this reflection, therefore, enables increase of received power, and thus, high-speed transmission can be achieved.

Heretofore, the present invention has been described referring to the above example embodiments, but the present invention is not limited to the above example embodiments. Various modifications understandable by those skilled in the art can be made on the configurations and the details of the present inventions within the scope of the present invention. Further, any combination of the above example embodiments is applicable. For example, there may be employed a configuration in which a pilot signal unit of a transmitting unit transmits a pilot signal; a pilot signal unit of a receiving unit receives the pilot signal; and a distance determination unit of the receiving unit estimates a transmission distance from a transmitted time at the transmitting unit and a received time at the receiving unit with respect to the pilot signal, and the frequency of the pilot signal. Further, there may be employed a configuration in which an electrical conductivity acquisition unit is provided at the side of a receiving unit, and a transmission distance is estimated considering an electrical conductivity having been acquired by the electrical conductivity.

For example, the number of antennas included in each of a transmitting unit and a receiving unit is not limited to "1", and a plurality of antennas may be included in each of the transmitting unit and the receiving unit. Moreover, there may be employed a configuration including a function that allows MIMO (multiple-input and multiple-output) based communication using a plurality of antennas to be made.

Part or the whole of the above example embodiments can be also written as, but are not limited to, the following supplementary notes.

(Supplementary note 1) An underwater radio communication system for communicating underwater between a transmitting means and a receiving means with electromagnetic waves, the underwater radio communication system including a distortion compensation means configured to compensate for a distortion resulting from propagation in seawater in accordance with a frequency of the electromagnetic waves.

(Supplementary note 2) A transmitting means that is for use in an underwater radio communication system and that communicates in seawater with a receiving unit with electromagnetic waves, the transmitting means including a first distortion compensation means configured to apply, to a transmitting signal, a pre-distortion for compensating for a distortion due to an electrical conductivity of water.

(Supplementary note 3) The transmitting means according to supplementary note 2, further including a distance determination means configured to determine a transmission distance between the transmitting means and the receiving means, wherein the first compensation means determines an amplitude and a phase for the pre-distortion in accordance with a frequency of the transmitting signal and the transmission distance.

(Supplementary note 4) The transmitting means according to supplementary note 3, further including a transmitting baseband means configured to generate multicarrier modulated signals and change a bandwidth of each of subcarriers of the multicarrier modulated signals in accordance with a frequency of the each subcarrier and the transmission distance.

(Supplementary note 5) The transmitting means according to supplementary note 4, wherein the higher the frequency of the each subcarriers is, the further the transmitting baseband means widens the bandwidth of the each subcarrier.

(Supplementary note 6) The transmitting means according to any one of supplementary notes 3 to 5, further including a pilot signal means configured to receive, from the receiving means, a pilot signal including information in relation to a transmitted time of the pilot signal and a frequency of the pilot signal, wherein the distance determination means estimates the transmission distance from the transmitted time of the pilot signal, a received time of the pilot signal, and the frequency of the pilot signal.

(Supplementary note 7) The transmitting means according to any one of supplementary notes 3 to 6, further including an electrical conductivity acquisition means configured to acquire the electrical conductivity of seawater, wherein the distance determination means determines the transmission distance considering the electrical conductivity of seawater.

(Supplementary note 8) A receiving means that is for use in an underwater radio communication system and that communicates with a transmitting means underwater with electromagnetic waves, the receiving means including a second distortion compensation means configured to compensate for a distortion due to an electrical conductivity of seawater in a received signal.

(Supplementary note 9) The receiving means according to supplementary note 8, further including a distance determination means configured to determine a transmission distance between the transmitting means and the receiving, wherein the second distortion compensation means compensates for the distortion in accordance with a frequency of the received signal and the transmission distance.

(Supplementary note 10) The receiving means according to supplementary note 8 or supplementary note 9, being further configured to receive a signal having been emitted from the transmitting means and having been reflected at a seabed surface, a seawater surface, or both of the seabed surface and the seawater surface.

(Supplementary note 11) An underwater radio communication method for communicating underwater with electromagnetic waves, the underwater radio communication method including applying, to a transmitting signal, a pre-distortion for compensating for a distortion due to an electrical conductivity of seawater.

REFERENCE SIGNS LIST 1, 2, 3, 4, 5, 6 and 7: underwater radio communication system
10, 15, 30, 35, 45 and 55: transmitting unit
20, 25, 40 and 50: receiving unit
11 and 31: transmitting baseband unit
12, 26, 36 and 41: distortion compensation unit
13: transmitting RF unit
21: receiving RF unit
22: receiving baseband unit
32, 42, 47 and 52: distance determination unit
33: signal determination unit
46 and 51: pilot signal unit
56: electrical conductivity acquisition unit
60: antenna

The invention claimed is:

1. A transmitting unit that is for use in an underwater radio communication system and that communicates in water with a receiving unit with electromagnetic waves, the transmitting unit comprising;
   a hardware processor configured to implement;
      applying to a transmitting signal, aa pre-distortion for compensating for a distortion due to an electrical conductivity of seawater;
      determining a tranmission distance between the transmitting unit and the receiving unit; and
      determining an amplitude and a phase for the pre-distortion in accordance with a frequency of the transmitting signal and the transmission distance.

2. The transmitting unit according to claim 1, wherein the hardware processor is further configured to implement generating multicarrier modulated signals and changing a bandwidth of each of subcarriers of the multicarrier modulated signals in accordance with a frequency of the each subcarrier and the transmission distance.

3. The transmitting unit according to claim 2, wherein the higher the frequency of the each subcarrier is, the further the the bandwidth of the each subcarrier.

4. The transmitting unit according to claim 1, wherein the at least one hardware processor is further configured to implemnt:
receiving from the receiving unit, a pilot signal including information in relation to a transmitted time of the pilot signal and a frequency of the pilot signal; and
estimating the transmission. distance from the transmitted time of the pilot signal, a received time of pilot signal, and the frequency of the pilot signal.

5. The transmitting unit according to claim 1, wherein the at least one hardware processor is further configured to implement;
aquiring the electrical conductivity of seawater; and
determinig the transmission considering the electrical conductivity of seawater.

6. A receiving unit that is for use in an underwater radio communication system that communicates with a transmitting unit underwater with electromagnetic waves, the receiving unit comprising:
at least one hardware processor configured to implement:
compensating for a distortion due to an electrical conductivity of a seawater in a received signal;
determining a transmission distance between the transmitting unit and the receiving unit; and
compensating for the distortion in accordance with a frequency of the received signal and the transmission distance.

7. The receiving unit according to claim 6, being further configured to receive a signal having been emitted from the transmitting unit and having been reflected at a seabed surface, a seawater surface, or both of the seabed surface and the seawater surface.

8. A receiving method that is for use in an underwater radio communication system and for communicating with a transmitting unit underwater with electromagnetic waves, the receiving method comprising:
compensating for a distortion due to an electrical conductivity of seawater in a received signal;
determining a transmission distance between the transmitting unit and the receiving unit; and
compensating for the distortion in accordance with a frequency of the received signal and the transmission distance.

* * * * *

UNITED STATES PATENT AND TRADEMARK OFFICE
CERTIFICATE OF CORRECTION

PATENT NO. : 10,749,611 B2
APPLICATION NO. : 16/331671
DATED : August 18, 2020
INVENTOR(S) : Shuhei Yoshida and Masahiro Tanomura It is certified that error appears in the above-identified patent and that said Letters Patent is hereby corrected as shown below:

In the Claims

Column 12, Line 49; In Claim 1, delete "comprising;" and insert --comprising:-- therefor Column 12, Line 50; In Claim 1, delete "implement;" and insert --implement:-- therefor Column 12, Line 51; In Claim 1, after "applying", insert --,--

Column 12, Line 51; In Claim 1, delete "aa" and insert --a-- therefor

Column 12, Line 54; In Claim 1, delete "tranmission" and insert --transmission-- therefor Column 12, Line 67; In Claim 3, before "the bandwidth", insert --at least one hardware processor implements widening--

Column 13, Line 3; In Claim 4, delete "implemnt:" and insert --implement:-- therefor Column 13, Line 4; In Claim 4, delete "receiving" and insert --receiving,-- therefor Column 13, Line 7; In Claim 4, delete "transmission." and insert --transmission-- therefor Column 13, Line 8; In Claim 4, after "of", insert --the--

Column 13, Line 12; In Claim 5, delete "implement;" and insert --implement:-- therefor Column 13, Line 13; In Claim 5, delete "aquiring" and insert --acquiring-- therefor Column 13, Line 14; In Claim 5, delete "determinig" and insert --determining-- therefor Column 13, Line 14; In Claim 5, after "transmission", insert --distance--

Signed and Sealed this
Eighth Day of December, 2020

Andrei Iancu
*Director of the United States Patent and Trademark Office*

Column 13, Line 17; In Claim 6, after "system", insert --and--

Column 13, Line 22; In Claim 6, after "of", delete "a"